(12) United States Patent
Palermo et al.

(10) Patent No.: US 6,459,882 B1
(45) Date of Patent: *Oct. 1, 2002

(54) INDUCTIVE COMMUNICATION SYSTEM AND METHOD

(75) Inventors: Vincent Palermo, Westford; Patrick J. Cobler, Belmont; Neal R. Butler, Acton, all of MA (US)

(73) Assignee: Aura Communications, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/053,107

(22) Filed: Apr. 1, 1998

Related U.S. Application Data

(63) Continuation of application No. 08/824,260, filed on Mar. 26, 1997, which is a continuation of application No. 08/444,017, filed on May 18, 1995, now abandoned.

(51) Int. Cl.[7] ................................................. H04B 5/06
(52) U.S. Cl. ........................ 455/41; 455/11.1; 455/66; 455/101; 455/133; 455/575
(58) Field of Search .................. 455/41, 11.1, 66, 455/101, 133, 575, 74, 274, 131, 134, 73, 82; 343/742, 862

(56) References Cited

U.S. PATENT DOCUMENTS

| | | | |
|---|---|---|---|
| 3,617,890 A | 11/1971 | Kurauchi et al. | 325/51 |
| 3,898,565 A | 8/1975 | Takeuchi et al. | 325/28 |
| 4,061,972 A | 12/1977 | Burgess | 325/16 |
| 4,117,271 A | 9/1978 | Teeter et al. | 179/82 |
| 4,160,952 A | 7/1979 | Seastrand, Jr. | 325/369 |
| 4,334,315 A | 6/1982 | Ono et al. | 455/11 |

(List continued on next page.)

FOREIGN PATENT DOCUMENTS

| | | |
|---|---|---|
| DE | 36 03 098 A1 | 1/1987 |
| DE | 93 09 032 | 12/1994 |
| DE | 29609349 | 12/1996 |
| EP | 0 296 092 | 12/1988 |
| EP | 0700184 A2 | 3/1996 |
| FR | 2431227 | 7/1978 |
| GB | 1164281 | 9/1966 |
| GB | 2197160 A | 5/1988 |
| GB | 2277422 A | 10/1994 |
| WO | 92/17991 | 10/1992 |
| WO | 96/10878 | 4/1996 |
| WO | 96/37052 | 11/1996 |

OTHER PUBLICATIONS

International Search Report for PCT/US98/07785, 7 pages.
International Search Report, PCT/US96/07144, Sep. 20, 1996, 7 pp.
Plantronics advertisement, Santa Cruz, CA, 1994, 1 page.
Jabra advertisement, San Diego, CA, 1994, 1 page.
Fujitsu advertisement, Reader Service No. 14, 1 page,
Hello Direct advertisement, 1 page,
International Search Report for PCT/US98/07768, 7 pages.

*Primary Examiner*—Lee Nguyen
(74) *Attorney, Agent, or Firm*—Hamilton, Brook, Smith & Reynolds, P.C.

(57) ABSTRACT

A system and method communicate signals between a portable unit and a communications system. The portable device communicates with a base unit using inductive coupling. The base unit is further connected to a wider communication system such as a telephone network. Multiple, orthogonally arranged transducers are used in the base unit to provide a more complete magnetic field and to prevent mutual inductance nulls which are otherwise present in a magnetic field. The use of short-range inductive coupling minimizes the power requirements and limits interference with other sources. The inductive coupling may also be used to recharge a battery in the portable device.

65 Claims, 3 Drawing Sheets

U.S. PATENT DOCUMENTS

| | | | |
|---|---|---|---|
| 4,334,316 A | 6/1982 | Tanaka | 455/139 |
| 4,373,207 A | 2/1983 | Hecken | 455/139 |
| 4,373,210 A | 2/1983 | Karabinis et al. | 455/273 |
| 4,442,434 A | 4/1984 | Baekgaard | 343/701 |
| 4,489,330 A | 12/1984 | Marutake et al. | 343/742 |
| 4,513,412 A | 4/1985 | Cox | 370/29 |
| 4,542,532 A | 9/1985 | McQuilkin | 455/78 |
| 4,584,707 A | 4/1986 | Goldberg et al. | 455/41 |
| 4,600,829 A | 7/1986 | Walton | 235/439 |
| 4,633,519 A | 12/1986 | Gotoh | 455/277 |
| 4,647,722 A | 3/1987 | Nishida et al. | 379/63 |
| 4,654,883 A | 3/1987 | Iwata | 455/89 |
| 4,669,109 A | 5/1987 | Le Cheviller et al. | 379/143 |
| 4,733,402 A | 3/1988 | Monsen | 375/100 |
| 4,747,158 A | 5/1988 | Goldberg et al. | 455/11 |
| 4,752,776 A | 6/1988 | Katzenstein | 340/825.54 |
| 4,845,751 A | 7/1989 | Schwab | 381/25 |
| 4,918,737 A | 4/1990 | Luethi | 381/68.4 |
| 4,939,791 A | 7/1990 | Bochmann et al. | 455/276 |
| 4,967,695 A | 11/1990 | Giunta | 119/29 |
| 5,054,112 A | 10/1991 | Ike | 455/41 |
| 5,247,293 A | 9/1993 | Nakagawa | 340/825.25 |
| 5,276,686 A | 1/1994 | Ito | 370/95.1 |
| 5,276,920 A | 1/1994 | Kuisma | 455/101 |
| 5,390,357 A | 2/1995 | Nobusawa et al. | 455/134 |
| 5,437,057 A | 7/1995 | Richley et al. | 455/41 |
| 5,553,312 A | 9/1996 | Gattey et al. | 455/11.1 |
| 5,568,516 A | 10/1996 | Strohallen et al. | 375/259 |
| 5,596,638 A | 1/1997 | Paterson et al. | 379/430 |
| 5,615,229 A | 3/1997 | Sharma et al. | 375/259 |
| 5,722,050 A | 2/1998 | Chen | 455/66 |
| 5,771,438 A | 6/1998 | Palermo et al. | 455/41 |

INDUCTIVE COMMUNICATION SYSTEM AND METHOD

CROSS-REFERENCE TO RELATED APPLICATIONS

This is a continuation of pending U.S. patent application Ser. No. 08/824,260 filed Mar. 26, 1997 which is a file wrapper continuation of abandoned U.S. patent application Ser. No. 08/444,017 filed May 18, 1995.

BACKGROUND OF THE INVENTION

1. Field of the Invention

The present invention relates to short-range wireless communication systems, and more particularly to systems utilizing inductive coupling.

2. Discussion of the Related Art

When using a telephone, continually holding the handset to one's ear can be awkward. Also, holding the telephone interferes with the use of both hands for other work while trying to talk. In particular, the use of cellular telephones, which has increased dramatically, can interfere with the user's proper operation of an automobile. Various techniques have been used to overcome these difficulties.

Speakerphones allow one to talk while roaming around a room and using one's hands. However, speaker volume can disturb others around the user. They also cannot be used in close proximity to other speakerphones due to interference. They have limited privacy since the speaker broadcasts the conversation to all within earshot. Typically, the user must speak more loudly than normal to have proper reception at the microphone. Also, they tend to have poor sound quality because the user is not near the microphone and acoustics in the room are poor.

Headsets have been another way to free up the hands of a telephone user. Typically, the headset includes an adjustable strap extending across the user's head to hold the headset in place, at least one headphone located by the user's ear, and a microphone which extends from the headset along and around the user's face to be positioned in front of the user's mouth. The headset is attached by a wire to the telephone. Headsets have the disadvantages of being bulky and somewhat awkward to use. Although they permit hands free use of the telephone, the user has limited mobility due to the connecting wire.

Wireless headsets have also been developed which eliminate the connecting wire to the telephone. The wireless headset uses radio frequency (RF) technology or infrared technology for communicating between the headset and a base unit connected to the telephone. The need for communications circuitry and sufficient power to communicate with the base unit increases the bulk and weight of the headset. This increased weight can become tiresome for the user. One alternative has been to attach the headset by a wire to a transmitting unit worn on the belt of the user. As with wired headsets, the wire can become inconvenient and interfere with other actions by the user. Significant interference rejection circuitry is also needed when multiple wireless headsets are used in close proximity.

Therefore, a wireless communication system for telephones is desired with will provide greater convenience and comfort for the user.

SUMMARY OF THE INVENTION

The deficiencies of prior art systems are overcome by the present invention which, in one aspect, includes a short-range, wireless communication system including a miniaturized portable transceiver and a base unit transceiver. The miniaturized portable transceiver sends and receives information through magnetic induction to the base unit, which may also be portable. Similarly, the base unit sends and receives information through magnetic induction to the portable transceiver. The information can be voice, data, music, or video. Use of magnetic induction fields reduces the power requirements and thus allows a smaller size and greater convenience.

In another aspect of the present invention, the base unit may include multiple, orthogonally arranged transducers for generating multiple magnetic fields. The multiple fields substantially eliminates mutual inductance nulls between the base unit and portable unit which result at certain positions in a generated field. In another aspect of the present invention, the multiple transducers may be selectively operated based upon a strongest signal, in order to limit power consumption.

In another aspect of the present invention, a headset contains the miniaturized transceiver which communicates with the base unit through magnetic induction fields. The information sent between the headset and the base unit may be voice or data. In another aspect of the present invention, the headset may be of the concha type in which the speaker fits into the user's ear without a strap across the head and the transceiving transducer is encapsulated into the microphone boom which is short and straight along the user's cheek. In another aspect of the invention, the base unit may be a portable telephone, which can be attached to the user, to further transmit communications from the wireless communication system to a cellular telephone network or a cordless telephone unit.

In another aspect of the invention, the headset may fit in a receptacle in the portable base unit in order to recharge the battery in the headset. In another aspect of the invention, the battery may be recharged via the magnetic inductive link between the base unit and the headset.

With these and other objects, advantages and features of the invention that may become apparent, the nature of the invention may be more clearly understood by reference to the following detailed description of the invention, the appended claims and the several drawings attached hereto.

DETAILED DESCRIPTION

Figure 1:
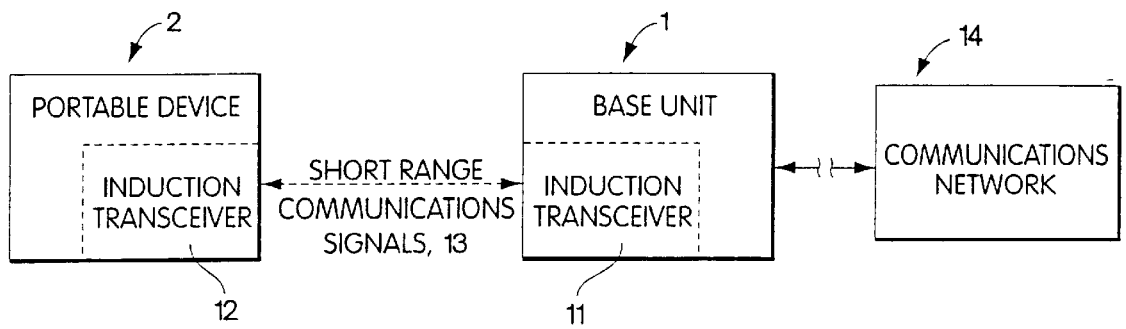
FIG. 1 illustrates schematically the wireless communication system of the present invention.

FIG. 1 illustrates schematically a short-range magnetic communication system 1 including a portable device 2 and a base unit 1, which connects to a long-range communication network 14. Contained within each of the base unit 1 and the portable device 2 is a short-range miniaturized magnetic induction transceiver 11, 12, which can simultaneously transmit and receive communications signals 13. These signals may be voice, audio, data, or video. The communications network 14 may be any network in which it would be desirable for these signals to be communicated over a terminal link without wires, such as a telephone network, personal communications (PCS) network, special mobile radio (SMR) network, computer system or network, and video conferencing systems. The base unit 1 may any part of the communications network 14 from which it would be desirable to communicate to another device without wires; for example, it may be a telephone headset, PCS headset, SMR headset, walkie-talkie, computer or computer peripheral devices, personal digital assistant (PDA), or video game controller. The portable device 2 may be any device from which it would be desirable to communicate without wires to a communications network; for example, it may be a telephone headset or handset, portable computer or computer peripheral device, headphone, or video input device.

Figure 2:
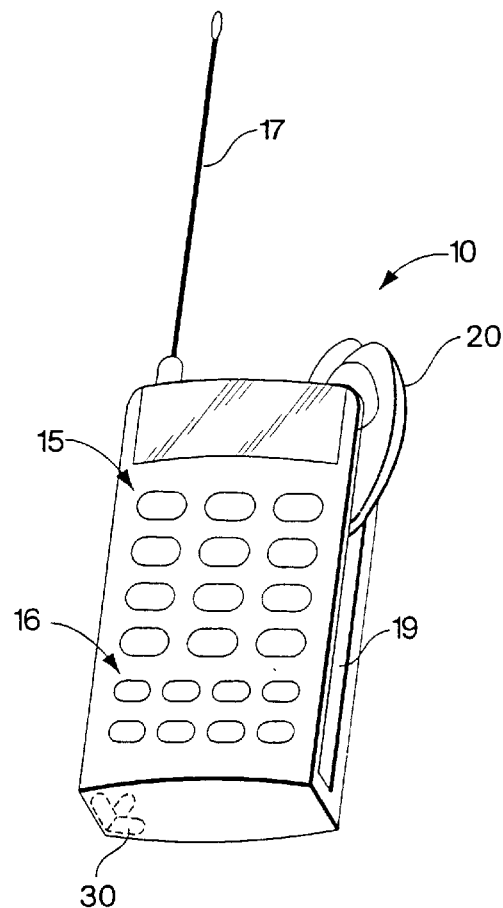
FIG. 2 illustrates a telephone headset as the base unit in the communication system of FIG. 1.

As illustrated in FIG. 2, one example of the base unit 1 is a portable telephone 10 having a plurality of number buttons 15 and a plurality of function buttons 16. A retractable antenna 17 communicates with a cellular telephone network or a cordless telephone base unit. The portable telephone 10 operates in a manner similar to that of an ordinary cellular or cordless telephone handset. Signals are sent to and received from the telephone network in an ordinary manner. The portable telephone 10 includes a transducer system 30 which communicates by magnetic induction with headset 20, which operates as the portable device 2, to provide the outputs and inputs to the portable telephone 10. The portable telephone 10 may also include a mouthpiece or earpiece (not shown) as in a regular telephone headset, allowing the user to choose between a conventional method of operation and a hands-free use afforded by the headset 20.

Figure 3:
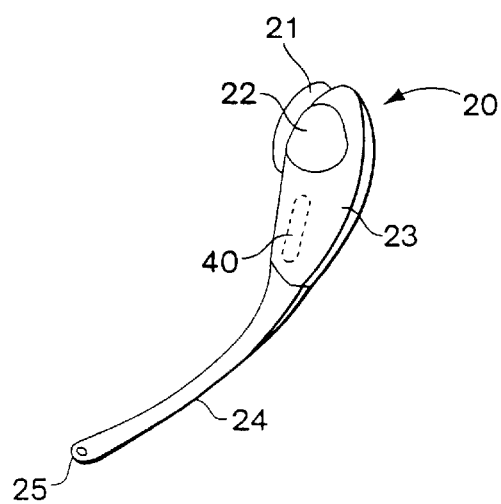
FIG. 3 illustrates a headset that is utilized as the portable device in the communication system of FIG. 1.

The portable device 2 as a headset 20 is illustrated more fully in FIG. 3. It includes a body portion 23 which houses a transducer 40 and processing circuitry. A speaker 22 is connected to the circuitry within the body 23. An earpiece 21 next to the speaker 22 fits in the user's ear to hold the unit in place and to allow the user to hear sounds from the speaker. A microphone boom 24 extends from the body 23 several inches in order to place a microphone 25, located at the end of the boom 24, close to the user's mouth. Alternatively the transducer 40 may be housed in the boom 24. A rechargeable battery 51 is also housed in the body 23 of the headset 20 to provide power to the headset. Other features may be optionally included in the headset 20, such as switcher or buttons for manually activating different modes. For example, a capacitive switch or push-button could be used to cause the headset 20 to transmit a control signal to the portable phone 10 to activate muting of the microphone. The portable phone 10 may include a receptacle 19 for receiving and holding the headset 20. Depositing the headset in the receptacle can provide a variety of functions, in addition to maintaining the headset 20 and portable phone 10 together. A switch can be disposed in the receptacle to terminate the telecommunication when the headset 20 is inserted or initiate the telecommunication when it is removed. The receptacle may also include connections to recharge the battery 51 in the headset 20.

The base unit 1 and portable device 2 communicate through amplitude modulation of inductive fields, although other modulation methods such as frequency or phase modulation could be employed. During use, the distance between the portable device 2 and the base unit 1 typically is short. Since the distance is short, only an inductive field is necessary, and little or no radiation occurs. This limits the operating power, which allows a smaller size and weight for the rechargeable battery 51 and, thus, the portable device 2. Furthermore, it limits interference between systems operating in close proximity. Therefore, interference rejection circuitry may be limited or not necessary in the portable device 2.

Figure 4:
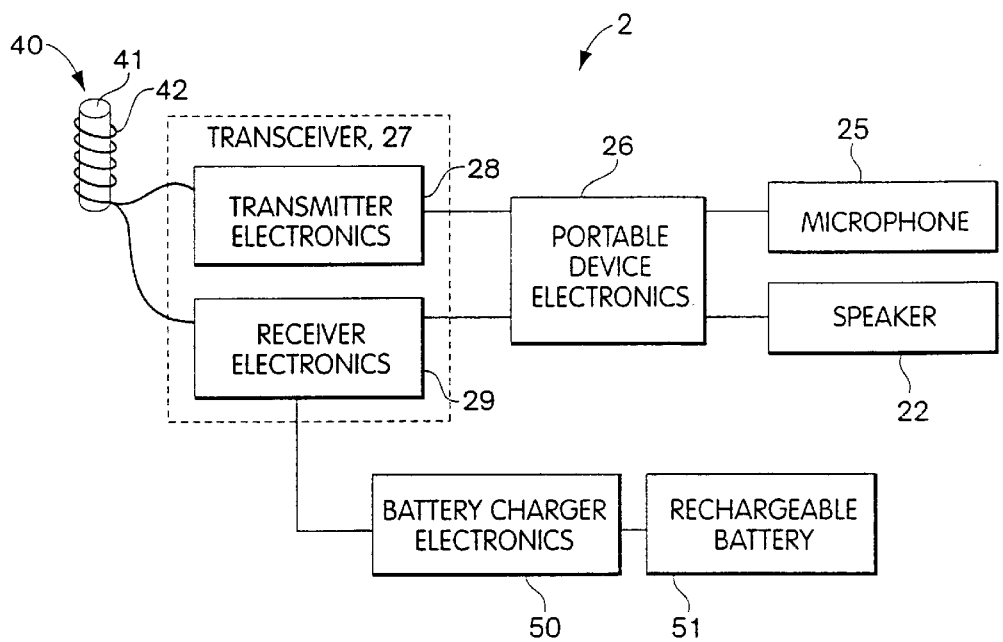
FIG. 4 illustrates schematically the transducer and electronics of the portable

The transducer system in the portable device 2 is illustrated schematically in FIG. 4. The transducer 40 preferably includes a ferrite rod transducer having a ferrite rod 41 within a wire coil 42. The wires from the transducer 40 are connected to a transceiver 27 having transmitter electronics 28 and receiver electronics 29. The transceiver 27 connects to the portable device electronics 26, the nature of which is dependent upon the function of the portable device 2. In the example of the portable device as a headset 20, the portable device electronics would connect to a speaker 22 and a microphone 25. Transmission and reception can occur at different frequencies, which permits full duplex operation. Alternatively, separate transmitting and receiving transducers can be used.

Figure 5:
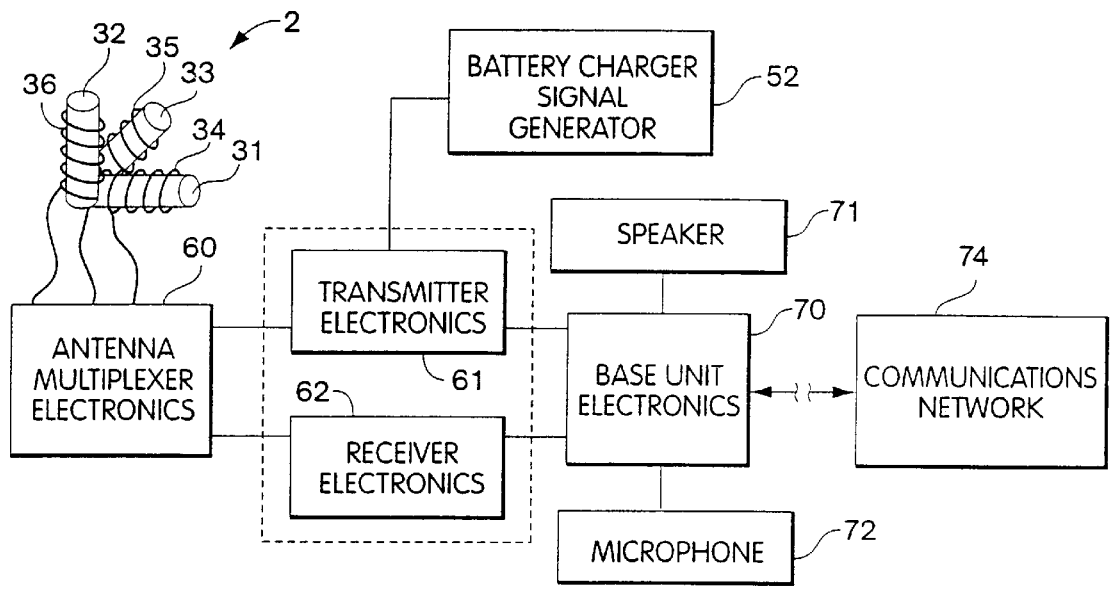
FIG. 5 illustrates schematically the transducer and electronics of the base unit.

The base unit 1 configuration is illustrated schematically in FIG. 5. The transducer system 30 includes three orthogonally disposed ferrite rod transducers, each including a ferrite rod 31, 32, 33 and a respective coil 34, 35 and 36. The use of the orthogonally disposed transducers overcomes the occurrence of mutual inductance nulls in the resulting inductive fields. The three transducers are connected to multiplexer electronics 60 for selecting one or more of the transducers for transmission and reception. Circuitry may be used to select the transducer or transducer having the strongest signal for transmission and reception to reduce the total power consumption of the device. The transmitter electronics 61 and receiver electronics 62 provide for processing of the communications signals from the base unit electronics 70 and the portable device 2. As discussed above, for a portable telephone 10, the conventional telephone speaker 71 and mouthpiece 72 may be eliminated so that the portable telephone 10 solely used the headset 20 through the transducer system for communicating to the user. Switching circuitry (not shown) would be included to select between the speaker 71 and microphone 72, and the headset 20. The switching circuitry could be included in the receptacle 19 so that the speaker 71 and microphone 72 are disconnected when the headset 20 is removed.

Figure 6:
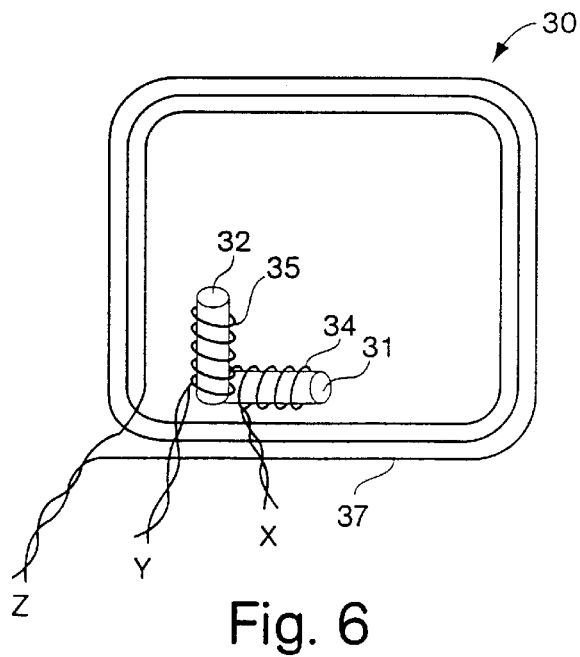
FIG. 6 illustrates an alternative transducer configuration for the base unit.

FIG. 6 illustrates a second embodiment of the transducer system for the base unit 1. In the transducer 30 of FIG. 6, one of the ferrite rod transducers is replaced with a loop coil transducer 37. A loop coil transducer can replace any or all of the ferrite rod transducers. The loop coil transducer 37 is disposed in the plane of the remaining ferrite rod transducers. This creates a transducer system having a decreased depth. As illustrated in FIG. 2, the three orthogonal transducers can be placed in a corner along the sides of the portable telephone 10. Alternatively, the loop coil transducer 37 could be placed along the back of the portable phone 10, so that it could made thinner.

Additionally, the transmission system can be used for charging the battery 51 of the portable device 2. The base unit 1 includes a battery charger signal generator 52 connected to the transmitter 61. This generator 52 produces a recharging signal which is sent through one of the ferrite rod transducers in the base unit 1 to the ferrite rod transducer 40 of the portable device 2. Since in the telephone embodiment of FIG. 2, the headset 20 and transducer 40 have a known orientation when in the receptacle 19, only one transducer in the portable telephone 10 needs to be energized to inductively transmit the recharging signal. As illustrated in FIG.

3, the wires from the transducer 40 in the portable device 2 are connected to a battery charger 50 which is used to charge the battery 51.

Although the communication system of the present invention has been illustrated in connection with a concha type headset 20 and a cellular or cordless telephone headset 10 as a base unit 1, it is readily adaptable for other types of headsets and uses. The headset can be of the over-the-head type, over-the-ear type, or binaural type. The system can be used as a wireless connection to a conventional desktop telephone. Such a system would operate in the manner discussed above with the cordless headset. Since several such units may be used in close proximity, interference may become more of a problem. Therefore, the system can be designed to operate on various frequencies and can select frequencies for the transmission and reception which are unlikely to have significant interference. Similarly, the system can be used with a computer, either stationary or portable, for voice data entry, sound transmission, and telephone functions. The system can also be used with other types of communication systems, including personal digital assistants (PDA's), cordless phones, PCS and SMR cellular phones, two way (video games), two-way half duplex (walkie-talkies, CBs), or two-way full duplex (phones). When the base unit is stationary and the user is likely to be at certain locations relative to the base unit, fewer transducers may be used in the base unit without encountering mutual inductance nulls. Alternative transducer systems may also be used for generating the inductive fields. Specifically, rather than a single transducer for transmission and reception on different frequencies, separate transducers may be used.

Having thus described one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and equivalent thereto.

What is claimed is:

1. An inductive communications system supporting bidirectional communications, comprising:
    a base unit transducer system including (i) at least three orthogonal transducers, (ii) a selector, coupled to said orthogonal transducers, for selectively energizing at least one of said orthogonal transducers to generate a first inductive field and (iii) a receiver circuit connected to said orthogonal transducers, for receiving and decoding a second inductive field on at least one of said orthogonal transducers; and
    a portable unit, disposed away from said base unit transducer system and within the first inductive field, the portable unit including:
        a portable unit transducer system including a single inductive transducer for generating the second inductive field, the base unit transducer system selecting, based on a field received from the single inductive transducer of the portable unit, one or more of the at least three orthogonal transducers of the base unit transducer system for transmission of a field to the portable unit.

2. The communications system of claim 1 wherein said base unit is connected to a communications network.

3. The communications system of claim 1 wherein said portable unit is a headpiece including a microphone and a speaker.

4. The communications system of claim 1 wherein said first inductive field and second inductive field are based on different carrier frequencies.

5. The communications system of claim 1 wherein said selector selects said at least one orthogonal transducer based on a strength of received signals.

6. The communications system of claim 1 wherein said portable unit transducer system includes a transmitter transducer for generating said second inductive field and a receiver transducer for converting said first inductive field.

7. A method for inductive communication, the method comprising:
    at a first device, receiving a first set of signals;
    selectively applying, based on a field received from a single inductive transducer of a second device, said first set of signals to at least one transducer of a transducer system having at least three orthogonal transducers, thereby generating a first inductive field based upon said first set of signals;
    receiving said first inductive field at the single inductive transducer of the second device;
    at the second device, generating a second inductive field based upon a second set of signals; and
    selectively receiving the second inductive field on at least one of said orthogonal transducers of the transducer system at the first device.

8. The method of claim 7 wherein said second set of signals is based on sound.

9. The method of claim 7 wherein said first set of signals is based on sound.

10. The method of claim 7 wherein said communications network comprises a telephone system.

11. The method of claim 7 wherein said communications network comprises a cellular telephone system.

12. An inductive communications system suitable for communication with a network, comprising:
    a base unit supporting two-way communication with the network, the base unit including a base unit transducer system including a set of three orthogonal transducers; and
    a portable unit including a single transducer, the portable unit supporting two-way communication with the base unit by means of first and second inductive fields produced respectively by the base unit transducer system and the single transducer, one of the set of three orthogonal transducers generating the first inductive field, the base unit selecting, based on a field received from the single inductive transducer of the portable unit, one or more of the three orthogonal transducers of the base unit for transmission of a field to the portable unit.

13. A system for communicating information over a wireless link, the system comprising:
    a first station including three inductive transducers, each oriented orthogonal to the others; and
    a second station including a single inductive transducer, the first and second stations being movable relative to each other, signals being transmitted as varying magnetic fields in bidirectional communications between the stations through inductive coupling of the transducers at any angular orientation of the stations relative to each other within a range of distance, the first station selecting, based on a field received from the single inductive transducer of the second station, one or more of the three inductive transducers of the first station for transmission of a field to the second station.

14. A system as in claim 13, wherein the first station transmits information to the second station by generating a field of magnetically encoded signals that are detected by a transducer at the second station.

15. A system as in claim 13, wherein an inductive transducer of the first station is selected to transmit magnetically encoded signals depending on which of the multiple inductive transducers at the first station receives a strongest signal.

16. A system as in claim 14, wherein the wireless link between the first station and second station supports two-way full duplex communication.

17. A system as in claim 13, wherein the first station transmits information over one of the three inductive transducers.

18. A system as in claim 13, wherein the wireless link between the first station and second station supports two-way half duplex communication.

19. A system as in claim 13, wherein at least one of the inductive transducers at the first station is an inductive loop coil.

20. A system as in claim 13, wherein the second station is disposed in a headset and the first station is a cellular device.

21. A system as in claim 13 wherein the first station receives information from another device and relays it to the second station over a varying magnetic field.

22. A system as in claim 13, wherein the first station is a portable device in communication with a network system.

23. A system as in claim 13 further comprising:
multiplexor electronics for selecting which of the three inductive transducers at the first station generates the varying magnetic field.

24. A system as in claim 13, wherein the information is transmitted based on amplitude modulation.

25. A system as in claim 13, wherein the information is transmitted based on frequency modulation.

26. A system as in claim 13, wherein the information is digital, voice or audio data.

27. A system as in claim 13, wherein information is transmitted from the first station to the second station based on a first frequency and information is transmitted from the second station to the first station based on a second frequency.

28. A system as in claim 13, wherein the second station is disposed in a headset.

29. A system as in claim 28, wherein the headset includes a microphone and a speaker.

30. A system as in claim 13, wherein the first station is a cellular device.

31. A system as in claim 13, wherein a frequency for transmitting information over the wireless link is selected to avoid interference.

32. A system as in claim 13, wherein separate transmitting and receiving transducers are used to support full duplex operation between the first and second stations.

33. A method for communicating information over a wireless link, the method comprising:
orienting three inductive transducers to be orthogonal to each other at a first station;
providing a single inductive transducer at a second station, the first and second stations being movable relative to each other;
transmitting signals as varying magnetic fields in bidirectional communications between the stations through inductive coupling of the transducers at any angular orientation relative to each other within a range of distance; and
selecting, based on a field received from the single inductive transducer of the second station, one or more of the three inductive transducers of the first station for transmission of a field to the second station.

34. A method as in claim 33 further comprising:
selecting an inductive transducer to generate a varying magnetic field at the first station depending on which of the three inductive transducers at the first station receives a strongest signal.

35. A method as in claim 33, wherein the wireless link between the first station and second station supports two-way full duplex communication.

36. A method as in claim 33, wherein the first station transmits information over one of the three inductive transducers.

37. A method as in claim 33, wherein the wireless link between the first station and second station supports two-way duplex communication.

38. A method as in claim 33, wherein at least one of the inductive transducers at the base station is an inductive loop coil.

39. A method as in claim 33, wherein the second station is disposed in a headset and the first station is a cellular device.

40. A method as in claim 33 further comprising:
receiving information from a device at the first station; and
at the first station, relaying the information from the device to the second station via the varying magnetic fields between the stations.

41. A method as in claim 33, wherein the first station is a portable device in communication with a network.

42. A method as in claim 33 further comprising:
selecting which of the multiple inductive transducers at the first station will be used to generate the varying magnetic field, and multiplexing a corresponding signal from the first station to a selected inductive transducer.

43. A method as in claim 33 further comprising:
transmitting the information based on amplitude modulation.

44. A method as in claim 33 further comprising:
transmitting the information based on frequency modulation.

45. A method as in claim 33, wherein the information is digital, voice or audio data.

46. A method as in claim 33, wherein information is transmitted from the first station to the second station based on a first frequency and information is transmitted from the second station to the first station based on a second frequency.

47. A method as in claim 33 further comprising:
disposing the second station in a headset.

48. A method as in claim 47, wherein the headset includes a microphone and a speaker.

49. A method as in claim 33, wherein the first station is a cellular device.

50. A method as in claim 33 further comprising:
selecting a carrier frequency for transmitting information over the wireless link to avoid interference.

51. A method as in claim 33, wherein separate transmitting and receiving transducers are used to support full duplex operation between the first and second stations.

52. A system for communicating information over a wireless link, the system comprising:
a first station including an inductive transducer system for generating an inductive field in each of the three orthogonal orientations; and
a second station including a single inductive transducer, the first and second stations being movable relative to each other, signals being transmitted as varying magnetic fields in bidirectional communications between the stations through inductive coupling of the transducers at any angular orientation of the stations relative to each other within a range of distance, the first station selecting, based on a field received from the single inductive transducer of the second station, one or more of the three orthogonal orientations of the first station for transmission of a field to the second station.

53. A system as in claim 52, wherein an orientation of the inductive field transmitted from the first station is selected to transmit magnetically encoded signals depending on an orientation of the inductive transducer at the second station.

54. A system as in claim 52, wherein the second station is disposed in a headset and the first station is a cellular device.

55. A system as in claim 52 wherein the first station receives information from another device and relays it to the second station over a varying magnetic field.

56. A system as in claim 52, wherein information is transmitted from the first station to the second station based on a first frequency and information is transmitted from the second station to the first station based on a second frequency.

57. A system as in claim 52, wherein the second station is disposed in a headset.

58. A system as in claim 52, wherein a frequency for transmitting information over the wireless link is selected to avoid interference.

59. A method for communicating information over a wireless link, the method comprising:

providing an inductive transducer system at a first station for generating an inductive field in one of three orthogonal orientations;

providing a single inductive transducer at a second station, the first and second stations being movable relative to each other;

transmitting signals as varying magnetic fields in bidirectional communications between the stations through inductive coupling of the transducers at any angular orientation relative to each other within a range of distance; and selecting, based on a field received from the single inductive transducer of the second station, one of the three orthogonal orientations of the inductive field of the first station for transmission of a field to the second station.

60. A method as in claim 59 further comprising:

selecting an orientation of the inductive field transmitted by the inductive transducer system of the first station to communicate information to the second station.

61. A method as in claim 59, wherein the second station is disposed in a headset and the first station is a cellular device.

62. A method as in claim 59 further comprising:

receiving information from a device at the first station; and at the first station, relaying the information from the device to the second station via the varying magnetic fields between the stations.

63. A method as in claim 59, wherein information is transmitted from the first station to the second station based on a first frequency and information is transmitted from the second station to the first station based on a second frequency.

64. A method as in claim 59 further comprising the step of:

disposing the second station in a headset.

65. A method as in claim 59 further comprising:

selecting a carrier frequency for transmitting information over the wireless link to avoid interference.

* * * * *